United States Patent [19]
Lange

[11] 3,906,182
[45] Sept. 16, 1975

[54] CHAIN WELDING MACHINE

[75] Inventor: Gerhard Lange, Reutlingen, Germany

[73] Assignee: Wafios, Maschinenfabrik, Wagner, Ficker & Schmid, Reutlingen, Germany

[22] Filed: Apr. 8, 1974

[21] Appl. No.: 458,516

[30] Foreign Application Priority Data
Apr. 7, 1973  Germany............................ 2317690

[52] U.S. Cl. ................................................. 219/51
[51] Int. Cl.² .......................................... B21L 3/02
[58] Field of Search ...................................... 219/51

[56] References Cited
UNITED STATES PATENTS

| | | | |
|---|---|---|---|
| 2,288,494 | 6/1942 | Speed et al. ........................... | 219/51 |
| 2,684,422 | 7/1954 | Esser et al. ............................ | 219/51 |
| 3,116,404 | 12/1963 | Esser..................................... | 219/51 |
| 3,175,353 | 3/1965 | Coffey ............................... | 219/51 X |
| 3,193,655 | 7/1965 | Kleine-Weischede ................ | 219/51 |
| 3,551,633 | 12/1970 | Wattler et al......................... | 219/51 |

Primary Examiner—J. V. Truhe
Assistant Examiner—N. D. Herkamp
Attorney, Agent, or Firm—Wigman & Cohen

[57] ABSTRACT

This disclosure relates to a chain welding machine for the resistance butt welding of interlinked chain links bent into a C-shape, with two oppositely pivotable compression levers coupled with tool carriers for compression tools adapted to engage the rounded parts of the chain link which is to be welded, the compression tools moving toward each other to compress the chain link when the compression levers are pivoted in opposite directions. The compression levers are actuated by a bank of springs through the medium of a control lever which carries at one end thereof a freely-running follower wheel which rolls on the periphery of a control cam plate which controls the movement of the control lever under the force of the springs. The follower wheel and at least a portion of the periphery of the cam plate are of electrically conducting material and an electrical circuit is maintained therethrough such that upon separation of the follower wheel from the periphery of the control cam plate the circuit will be opened thereby activating a signal and/or shutting down the operation of the machine. This separation will occur when the compression tools fail to move toward each other their maximum extent whereby an improperly welded link will result.

12 Claims, 3 Drawing Figures

CHAIN WELDING MACHINE

BACKGROUND OF THE INVENTION

This invention relates generally to the welding art, and more particularly to a chain welding machine for the resistance butt welding of interlinked chain links bent into a C-shape, with two oppositely pivotable compression levers coupled with tool carriers for compression tools adapted to engage the rounded parts of the chain link which is to be welded, the compression tools moving in opposite directions when the compression levers are pivoted in opposite directions, and which in each case form one leg of a two-leg knee lever with a knee angle between the legs of always less than 90°, the other leg being at least indirectly articulated on the spring-loaded arm of a common control lever, of which the positively moved arm carries a freely-running wheel which rolls on the periphery of a control cam plate mounted on a control shaft and operatively controlling the control lever.

A chain welding machine of this type is disclosed in German Patent Specification No. 1,811,914 in which the welding process changes from flash-butt welding to resistance-butt welding in the closing stages of the welding process. In this prior art machine a chain consisting of a plurality of interlinked chain links bent into the shape of a C is conveyed over a support frame including a saddle wherein each link is disposed during the compression and resistance butt welding thereof.

The compression of each chain link is accomplished by means of compression tools which engage opposite sides of the chain link and are moved toward each other to compress the link as the link is softened by means of the welding electrodes. Each compression tool is connected through a suitable linkage to compression levers which, in turn, are connected to a common control lever. The control lever is biased through a bank of springs to provide the compression force to the compression tools. Moreover, movement of the control lever is controlled through the medium of a control cam plate upon which a freely rotatable follower roller, carried by one end of the control lever, is adapted to roll.

In the event that the chain links which are to be welded are insufficiently heated during the welding process and therefore are not sufficiently softened, the force exerted by the bank of springs on the compression tools, through the control lever and the pivotable compression levers, will be insufficient to move the compression tools to their full predetermined extent. Consequently, links processed under these conditions are insufficiently welded and adversely affect the strength of the chain. Thus, they have to be removed and replaced by properly welded chain links.

The hitherto conventional methods, however, permit an examination of the quality of the weld only after completion of the entire chain. Consequently, even though a chain may include links having defective welds, the entire chain, including the defective links, must be subjected to all the desired thermal treatments subsequent to welding; for example, quenching and annealing. It should be understood, therefore, that when the defective links are removed from the completely treated chain and replaced by other properly welded links, the thermal treatment of the new links can be accomplished only at the expense of considerable time and money inasmuch as the chain already includes links which have been subjected to a first thermal treatment and, therefore, cannot be treated again in the same way.

The insufficient heating and softening of the chain links can result from impurities being present on the end faces of the links, as well poor centering which can lead to an insufficient contact between the link ends. Moreover, bent link ends as well as breakdowns in the supply of welding current, which is usually caused by a defective contact between the electrodes and the link ends, can also result in insufficient heating. In each of these cases, a cold weld of insufficient strength will result.

SUMMARY OF THE INVENTION

Hence, from what has been discussed above, it should be apparent that what is needed in this art is a chain welding machine for resistance butt welding which makes it possible, during the welding process, to determine whether there are defectively welded chain links which have not been compressed to the final dimension, and automatically to immobilize the machine so that this faulty chain link can be removed immediately so that only properly welded chain links are contained in the finished welded chain. It is, therefore, a primary object of this invention to provide a chain welding machine in which a signal is energized upon the occurrence of a defectively welded link.

More particularly, it is an object of this invention to provide a chain welding machine in which the failure of the compression tools to be moved toward each other to their maximum extent, in the event of an insufficiently softened link, will activate an electrical circuit to immobilize and shut down the machine.

Another object of this invention is to provide a welding machine of the type described wherein the control cam plate and the follower wheel attached to the control lever form parts of an electrical circuit, and wherein the separation of the follower wheel from the peripheral surface of the control cam plate breaks the circuit thereby indicating an insufficiently welded link.

Briefly described, these and other objects of the invention that will become hereinafter apparent are accomplished by utilizing the phenomena of the separation of the follower wheel on the control lever from the periphery of the control cam plate for purposes of indication and control. As previously described, the control cam plate includes a predetermined configuration such that the control lever, which carries the follower roller at one end thereof in engagement with the periphery of the cam plate, is caused to move under the force of the bank of springs so as to move the compression tools toward each other in engagement with a chain link. However, when a chain link is insufficiently heated the bank of springs will have insufficient force in which to continue the compression tools moving toward each other. Under these circumstances, the control lever, and thus the follower roller at the end thereof, will be fixed in space as the cam plate continues to rotate. Inasmuch as the cam surface at the end of the compression cycle is of decreasing radius, the periphery of the cam plate, in effect, will move away from the follower roller thereby creating a gap therebetween. It is this separation of the follower roller and the cam plate which will activate a control circuit, to be hereinafter described, thereby indicating the presence of a defectively welded link.

In accordance with this invention, therefore, there is provided a chain welding machine of the type mentioned above, including the features that the following wheel and at least a portion of the periphery of the control cam plate are made from an electrically conductive material and that between the wheel and the positively moved arm of the control lever there is an electrical insulator. The wheel and a portion of the periphery of the control cam plate represent the two halves, one of which is insulated to ground, of an electric contact which may be connected in the circuit of any desired per se known control arrangement which provides for an acoustic and/or electrical indication of interruption of the contact or an immediate shut-down of the machine. If, therefore, during the welding process, otherwise imperceptible deviations occur in the pattern of the link compression process, producing a retardation which may be caused for example by transfer resistances, differences in the shape of the link or in dimensions, the construction of the wheel and of the control cam plate as halves of contacts, according to the invention, provides an opportunity to intervene at once in order to isolate a defectively welded chain link. Chains welded with the chain welding machine according to the invention, therefore, once inspection is concluded, regularly require no further replacement of chain links, a task which entails the above-mentioned difficulties.

A preferred embodiment of chain welding machine according to the invention in which the entire control cam plate consists in a known manner of electrically conductive material, is characterized in that mounted on the control shaft is a switching cam which cooperates with the radially movable sensor of a fixed electric switch. By means of this cam actuated switch, the above-mentioned control arrangement can be controlled with regard to its capacity to react to a separation of the follower wheel off the periphery of the control cam plate, in other words, an opening of the contact formed by these two parts. The extent of the switching cam in the peripheral direction, measured as an angle, can be so selected according to location and amount, that the desired portion of the welding time is monitored. Under normal circumstances, this extent may conform to the identically measured extent of that portion of the periphery of the control cam plate which is associated with the final compression process so that the electrically conducting portion of the control cam plate could, for example, be formed by a segment of electrically conducting material. This control cam plate segment could be electrically isolated from the remaining portions of the control cam plate by a pair of radially extending electrically insulating layers, one positioned on each side of the segment. Alternatively, the entire control cam plate could be formed of an electrically insulating material covered or coated with a surface layer of electrically conducting material.

Since the sensitivity of the opening of the electric contact formed by the wheel and control cam plate depends to a substantial degree upon the magnitude and variability of the spring force with which one arm of the control lever is loaded, a preferred form of embodiment of chain welding machine according to the invention comprises a bank of springs consisting of a plurality of parallel connected traction loaded coil springs. Such a bank of springs compensates for differences in the spring constant between the various coil springs so that the restoring force of the bank of springs is accurately defined. Furthermore, for initially tensing the coil springs, a tensing device with an adjusting means is provided.

With the above and other objects in view that may become hereinafter apparent, the invention may be more clearly understood by reference to the several views illustrated in the accompanying drawings, the following detailed description thereof, and the appended claimed subject matter.

IN THE DRAWINGS

FIG. 1 is a fragmentary elevation view of a chain welding machine constructed in accordance with this invention, and illustrates a chain link disposed on the saddle and which is in position to be welded, the compression tool on the left of the center plane being shown in solid lines and engaging the chain link, the compression tool on the right-hand side of the central plane being shown in phantom and retracted from the chain link;

FIG. 2 is a diagrammatic elevation view of the control elements of the apparatus, portions thereof being shown in section, and illustrates the control cam plate and follower wheel in engagement therewith; and FIG. 3 is a fragmentary sectional view taken along line III—III of FIG. 2, and illustrates the manner in which the follower wheel is mounted in the control lever and is electrically insulated therefrom.

DESCRIPTION OF PREFERRED EMBODIMENT

Figure 1:
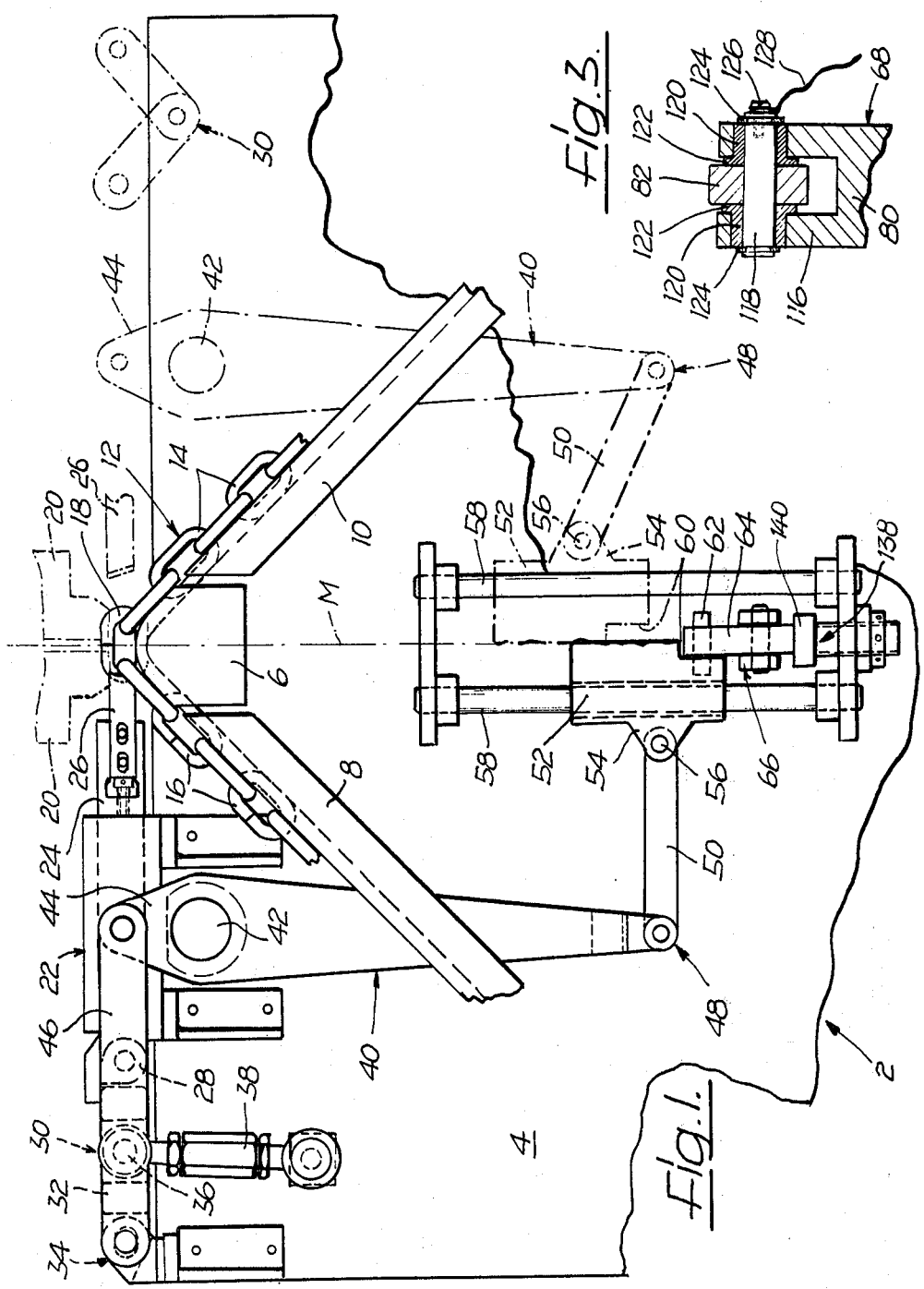

The embodiment illustrated is of substantially symmetrical construction with respect to the central plane M shown in FIG. 1. Where symmetry obtains, the description therefore extends to only one-half of the machine but is correspondingly applicable to the other half thereof.

A frame 2 of the machine has a vertical front panel 4 in front of the upper edge of which, symmetrical with the central plane M and in a vertical guide plane disposed perpendicular thereto, there is a rigidly disposed saddle 6 adjacent to which, on both sides of the central plane M and approximately at 45° with respect to the vertical and horizontal, are rails 8 and 10 for the infeed and/or discharge, respectively, of a chain 12 having a row of chain links 16 which are to be welded, of which every second chain link which is in the guide plane F engages into the rail 8, 10, while the other interposed chain links only lie on the rail 8 or 10. A transport appratus, not shown, ensures that the chain 12, after the horizontal upwardly disposed link ends of the chain link 18 disposed in the guide plane F on the saddle 6 have been welded by means of two welding electrodes 20, is transported on by two chain links so that after every transport step, whichever is the next chain link to be welded is disposed in the position described.

Outside of the central plane M, there is above each rail at the height of the chain link 18 a horizontal straight guide 22 for a tool carrier 24. At its front end adjacent the central plane M, each tool carrier 24 is provided with a compression tool 26 which is adjustable in an axial direction and the suitably shaped front end of which engages on the round portion of the chain link 18 which is immediately adjacent to it when the tool carrier 24 has completed a fast forward stroke which is followed by the actual compression stroke. Articulated at the rear end of the tool carrier 24 (remote from the compression tool 26) is the first leg 28 of a first two-legged knee lever 30, the second leg 32 of which is mounted on the frame 2 by means of a rotary and thrust joint 34. The knee 36 of the first knee lever 30 is alternately bent and stretched by a cam transmission, not shown, via a connecting rod 38, in order to retract the compression tool 26 always during the rapid traverse from the associated round portion of a chain link which has just been welded or, alternatively, in order to move it into engagement with the associated round portion of a chain link which is intended to be welded. FIG. 1 shows the first knee lever 30 on the left in the stretched and on the right in the bent positions.

On each side of the central plane M, the machine has a compression lever 40 which is restrictedly pivotable about a bolt 42 mounted on the frame 2, about an axis at right angles to the guide plane F. Each compression lever 40 is articulatingly connected on its short arm 44 through a flat bar 46 to the second leg 32 of the first knee lever 30 and forms the first leg of a second knee lever 48, the second leg of which is constructed as a tie bar 50 which is articulated by means of a lug 54 and a pivot 56 on a slide member 52 which is common to the tie bars 50 of both machine halves. The slide member 52 is guided on two rods 58 disposed parallel in the guide plane F and mounted on the frame 2. Between the rods 58, the slide member 52 has on its underside a recess 60 into which a tie bar 64 mounted to rotate on the slide member 52 about an axis parallel with the guide plane F, by means of a pivot 62, is guided. In its center, the tie bar 64 is hinged on the bifurcated end of a spring loaded arm 66 of a control lever 68 which is pivotably mounted on a bolt 72 disposed parallel with the front panel 4, in bearings 70 rigid with the frame.

The control lever 68 is part of a control cam transmission 74 (FIG. 2) which serves as a control for the movement of the two compression levers 40. The control cam transmission 74 has, mounted on a constantly revolving control shaft 76 which also drives the cam transmission for the first knee lever 30, a control cam plate 78 which cooperates with a follower wheel 82 rolling on its periphery and mounted at the bifurcated end of the positively moved arm 80 of the control lever 68, so that it operatively controls the control lever 68.

The spring force loading the arm 66 of the control lever 68 is applied by a bank 84 of springs through a chain 86 which can be shortened in the direction of application A by means of a tensioning means 88 with an adjusting means 90. The bank of springs 84 consists of a plurality of parallel connected traction-loaded coil springs 92 and has two plates 94 to which the ends of the coil springs 92 are connected and the upper of which is disposed rigid with the frame. The lower plate is connected to the spring loaded arm 66 of the control lever 68 via the chain 86. The tensioning device 88 which serves to tense the coil springs 92 has a first chain wheel 104 mounted on a pivot 102 so that it can rotate on the frame 2, a double tie bar 110 rotatably mounted on the pivot 102, a double tie bar 100 connected to an angle lever and mounted rigid with the double tie bar 110 on the pivot 102 and a second chain wheel 98 mounted to rotate thereon by means of a pivot 96. A portion of the chain 86 in each case partially and in an S-shaped configuration, passes around the two chain wheels 98 and 104. Between the second chain wheel 98 and the lower plate 94 of the springs 84, there is also a reversing pulley 106. The adjusting device 90 has a spindle nut 108 articulated on the double tie bar 110 as well as a spindle 114 rotatably mounted in a ball joint 113 on the front panel 4 and capable of rotating by means of a handwheel 112, the spindle 114 being screwed into the spindle nut 108. By turning the handwheel 112 it is possible to alter the axial position of the spindle nut 108 and so rotate the angle levers 100, 110 about the pivot 102.

The positively moved arm 80 of the control lever 68 which is made from electrically conducting material and grounded, has at its free end a fork 116 between the halves of which and likewise made from an electrically conducting material, is disposed the wheel 82 which is mounted on an electrically conductive journal 118 mounted on the fork halves. As an insulator, there are fitted onto the ends of the journal 118 which are held in the fork halves, sleeves 120 made from an electrically insulating material, for example, plastics material, each having a flange 122 disposed between the wheel 82 and in each case one of the fork halves. The journal 118 projects on both sides beyond the fork 116 and is axially secured by retaining rings 124. Screwed into one of the end faces of the journal 118 is a screw 126 which secures the stripped end of a wire 128 on the journal 118. Mounted on the control shaft 76 is a switching cam 130, the angular extent of which, in the peripheral direction of the control cam plate 78, conforms to the extent, measured in the same way, of the portion 132 of the periphery of the control cam plate 78 which is associated with the final compression stage of the compression tools 26. The switching cam 130, upon a rotation of the control shaft 76, is capable of actuating the radially movable sensor 134 of a fixed electric switch 136 in that the switching cam 130 runs up against the sensor 134 and moves it radially outwardly. The moment of actuation can, if the switching cam 130 is suitably disposed on the control shaft 76, coincide exactly with the commencement of the final compression process, although it could also occur before or after this moment, for example, coinciding with the commencement of the welding process. When the switching cam 130 again becomes detached from the sensor 134 at the termination of the welding operation, this latter moves radially inwardly so that the switch 136 is again enabled for reactivation.

The electrical contacts formed by the wheel 82, the control cam plate 78, and switch 136, are elements of an electrical control circuit 139 which includes a switching arrangement 137 connected to wheel 82 and switch 136 by electrical wires 128 and 129 respectively. Switching arrangement 137 is suitably connected to activate an electrical and/or acoustic indicator (not shown) or to automatically shut down the machine if the wheel 82, due to a retardation of the compression process, separates from the periphery of the control cam plate 78, thus opening the electrical circuit 139. It will be understood that the electrical circuit 139 performs its desired function during the time that the radially movable sensor 134 of switch 136 is being actuated by the switching cam 130, i.e., during the final compression process.

The end of the welding time may be determined as a function of time, for example, via a period counter, or as a function of travel, for example, via the control shaft 76 or a limit switch not shown but actuated by the slide member 52.

In the event that the control cam plate 78 does not or does not of itself determine the final minimum distance between the compression tools 26, a locked adjusting screw 138 is provided, the head 140 of which forms an abutment for the tie bar 64 on the slide member 52 when the said tie bar is in its lowest position, producing in the second knee lever 48 a knee angle of less than 90°.

Figure 2:
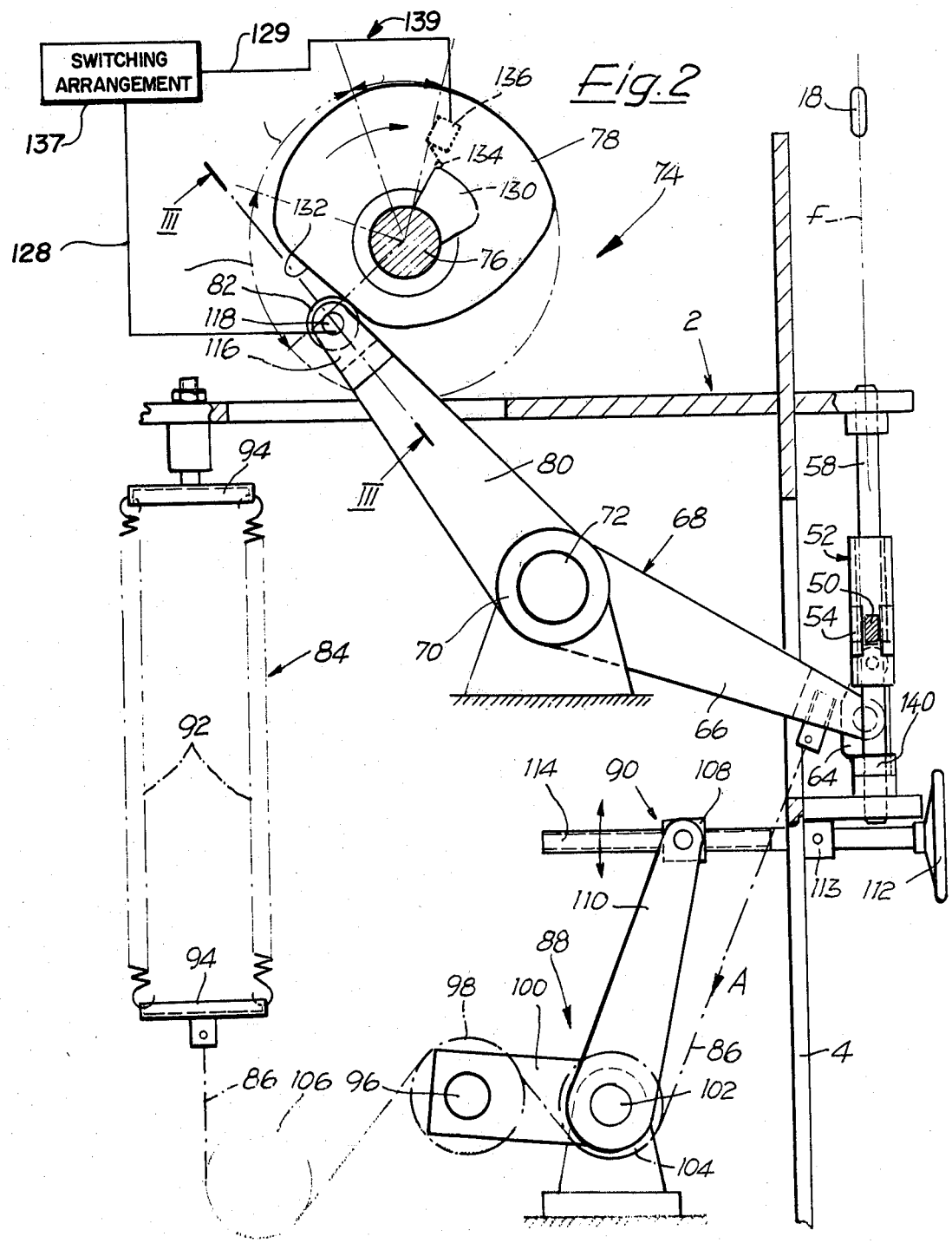

In operation, at the end of a complete welding cycle the cam plate 78 and follower wheel 82 are in the positions illustrated in FIG. 2. The cam plate 78 will then continue to rotate in a clockwise direction such that its rising peripheral surface (i.e., of increasing radial dimension) will push the follower wheel 82 outwardly so as to rotate the control lever 68 in the counter clockwise direction against the force of the spring bank 84. At the same time, the connecting rods 38 are being rotated by another cam transmission (not shown) so as to collapse the knee levers 30 to the position illustrated on the right-hand side of FIG. 1 in dot-dash lines. In this position the compression tools 26 are fully retracted and the levers 40 are in the positions shown by dash-dotted lines in the right-hand half of FIG. 1; i.e., the knee angle is in each case at its smallest. Thereafter, the cam transmission (not shown) rotates the connecting rods 38 inwardly so as to extend the levers 30 moving the compression tools 26 toward each other in a fast forward mode. At the same time the cam control plate 78 continues to rotate in the clockwise direction bringing the falling portion of its peripheral surface in proximity to the follower wheel 82. Thus, the control lever 68 is permitted to rotate clockwise under the force of the spring bank 84, pulling the slide member 52 downwardly thereby causing the compression levers 40 to rotate in opposite directions thus causing a final compression of the chain link 18 which is being heated by the welding electrodes 20.

In the event of a malfunction in the resistance circuit, or some other malfunction as discussed above, which causes the link 18 to be insufficiently heated, the force exerted by the spring bank 84 will be insufficient to move the compression tools 26 inwardly to their final extent. Thus, the control lever 68 and its follower wheel 82 will be, so to speak, frozen in space while the cam plate 78 continues to rotate with its descending portion 132 falling away or separating from the surface of the follower wheel 82. Consequently, the electrical circuit 139, which includes the switching arrangement 137, connected via wires 128, 129 to the wheel 82 and cam plate 78 will be broken, thereby activating an electrical and/or acoustic indicator or an automatic shutdown of the machine.

Although only a preferred embodiment of the invention has been specifically illustrated and described herein, it is understood that minor modifications could be made therein without departing from the spirit of the invention.

What is claimed is:

1. In a chain welding machine for resistance butt welding of interlinked chain links comprising oppositely movable compression members for engaging the rounded parts of a chain link to be welded, said compression members being movable in opposite directions as a result of the action of a control lever which carries a wheel which rolls on the periphery of a control cam plate, the improvement comprising said wheel and a portion of the periphery of said cam plate being constructed of electrically conducting material to form an electrical contact therebetween, electrical insulator means being provided between said wheel and said control lever, and electrical circuit means comprising a switching means for performing an indication or control function, said switching means being electrically connected to said wheel and said portion of the periphery of said cam plate, whereby separation of said portion of the periphery of said cam plate from said wheel will open said electrical contact thereby energizing said switching means.

2. A chain welding machine for resistance butt welding of interlinked chain links bent into a C-shape, comprising a frame in which are mounted two oppositely pivotable compression levers coupled with tool carriers for compression tool adapted to engage the rounded parts of a chain link for compressing said link during welding, the compression tools being movable in opposite directions when the compression levers are pivoted in opposite directions, and which in each case form one leg of a two-leg knee lever with a knee angle between the legs of always less than 90°, the other leg being at least indirectly articulated on a spring-loaded arm of a common control lever, of which a positively moved arm carries a freely-running wheel which rolls on the periphery of a control cam plate mounted on a control shaft and operatively controlling said control lever, said wheel and a portion of the periphery of said control cam plate being constructed of electrically conducting material to form an electrical contact therebetween, electrical insulator means being provided between said wheel and the positively moved arm of said control lever, and electrical circuit means comprising switching means for performing an indication or control function and being electrically connected to said wheel and said portion of the periphery of said cam plate, whereby separation of said portion of the periphery of said cam plate from said wheel will open said electrical contact thereby energizing said switching means.

3. A machine according to claim 2, wherein the entire control cam plate is of electrically conducting material and includes a switching cam electrically connected thereto and mounted on said control shaft, and wherein said electrical circuit means includes a fixed electric switch having a radially movable sensor and cooperating with said switching cam to form an electrical contact therebetween, said fixed electric switch being electrically connected to said switching means.

4. A machine according to claim 3, wherein the angular extent of said switching cam in the peripheral direction of said control cam plate conforms to a like extent of that portion of the periphery of said control cam plate associated with the compression of said links, said switching cam releasing the sensor and opening the electrical contact between said sensor and said switching cam at the termination of the welding operation.

5. A machine according to claim 2, wherein the positively moved arm of the control lever has at its free end a fork between the halves of which is disposed the wheel which is mounted on an electrically conducting journal mounted on the fork halves, and wherein said electrical insulator means comprise flanged sleeves arranged on said journal the flange of each sleeve being disposed between the wheel and one fork half.

6. A machine according to claim 5, wherein the journal has one end projecting from the fork halves, said one end being provided on its end face with a screw for securing an electrical wire thereto.

7. A machine according to claim 2, wherein said control lever is spring loaded by means of a bank of springs comprising a plurality of parallel connected tension coil springs.

8. A machine according to claim 7, wherein said bank of springs has two plates to which the ends of said springs are attached, one of said plates being rigid with the frame of the machine.

9. A machine according to claim 8, wherein the other of said plates is connected by means of a chain to said spring loaded arm of said control lever.

10. A machine according to claim 9, further including tensioning means for initially stressing said coil springs.

11. A machine according to claim 10, wherein said tensioning means has a first chain wheel rotatably mounted on said frame and a second chain wheel arranged on an arm pivotable about the axis of said first chain wheel, the axis of said second chain wheel being movable by an adjusting arrangement, a portion of the chain running in an S-shaped path around the two chain wheels.

12. A machine according to claim 11, wherein said adjusting arrangement comprises a spindle nut articulated on one arm of an angle lever which is part of said tensioning means and which is mounted on the fixed pivot of said first chain wheel, said spindle nut cooperating with a spindle having operating means rotatably and pivotably mounted on said frame, the second chain wheel being mounted on the other arm of said angle lever.

* * * * *